United States Patent Office.

THOMAS ATWOOD WILLSON, OF READING, PENNSYLVANIA.

Letters Patent No. 113,124, dated March 28, 1871.

IMPROVEMENT IN TINTED GLASS FOR SPECTACLES, &c.

The Schedule referred to in these Letters Patent and making part of the same.

*To all whom it may concern:*

Be it known that I, THOMAS ATWOOD WILLSON, of the city of Reading, county of Berks and State of Pennsylvania, have invented new and useful Improvements in Pink-tinted or Colored Lenses for Spectacles or Eye-Glasses; and I do hereby declare the following to be an exact description thereof.

The nature of my invention consists in the process of preparing the tinted or colored lenses by graduating the alloy or coloring matter so that when the glass is cut into lenses the tint of the thick glass or higher magnifying power will be of the same color as those of a lower magnifying power, in which the glass is required to be thinner through the center.

The object is to make the tinted or colored lenses colorless to the eye of the wearer, while the same tint, color, or shade will be the same in the different focal numbers of spectacles or eye-glass lenses.

I use finely manufactured white optical glass. To one hundred parts of this mass I add one part of manganese, and about one-third, in weight, of chromium to that of the manganese; this will produce a certain shade of pink tint for the lower or lesser focal power of the lenses, but when the same quantities and mixture are used for a thicker lens (at the center of the glass) of a higher focal power, the shade of color is darker, and for every one or more additional inches of the distance or focal power of the lenses of the higher numbers of greater magnifying powers, I add more of the colorless optical glass, so as to diminish and lighten the shade of the lens when graduating the color of lens to a lower number, and I attain the required and proper tint by thus manipulating the mass.

What I claim as my invention, and desire to secure by Letters Patent, is—

The pink tint or colored lens of a uniform color or shade in the different focal numbers of spectacles or eye-glass lenses, so that each and every number has a like tint yet appears colorless to the eye of the wearer, as herein described and set forth.

THOMAS ATWOOD WILLSON.

Witnesses:
J. FRANKLIN REIGART,
EDM. F. BROWN.